April 12, 1938. R. F. EDDY 2,113,581
APPARATUS FOR HARVESTING FROZEN CONFECTIONS
Filed Sept. 25, 1934 3 Sheets-Sheet 1
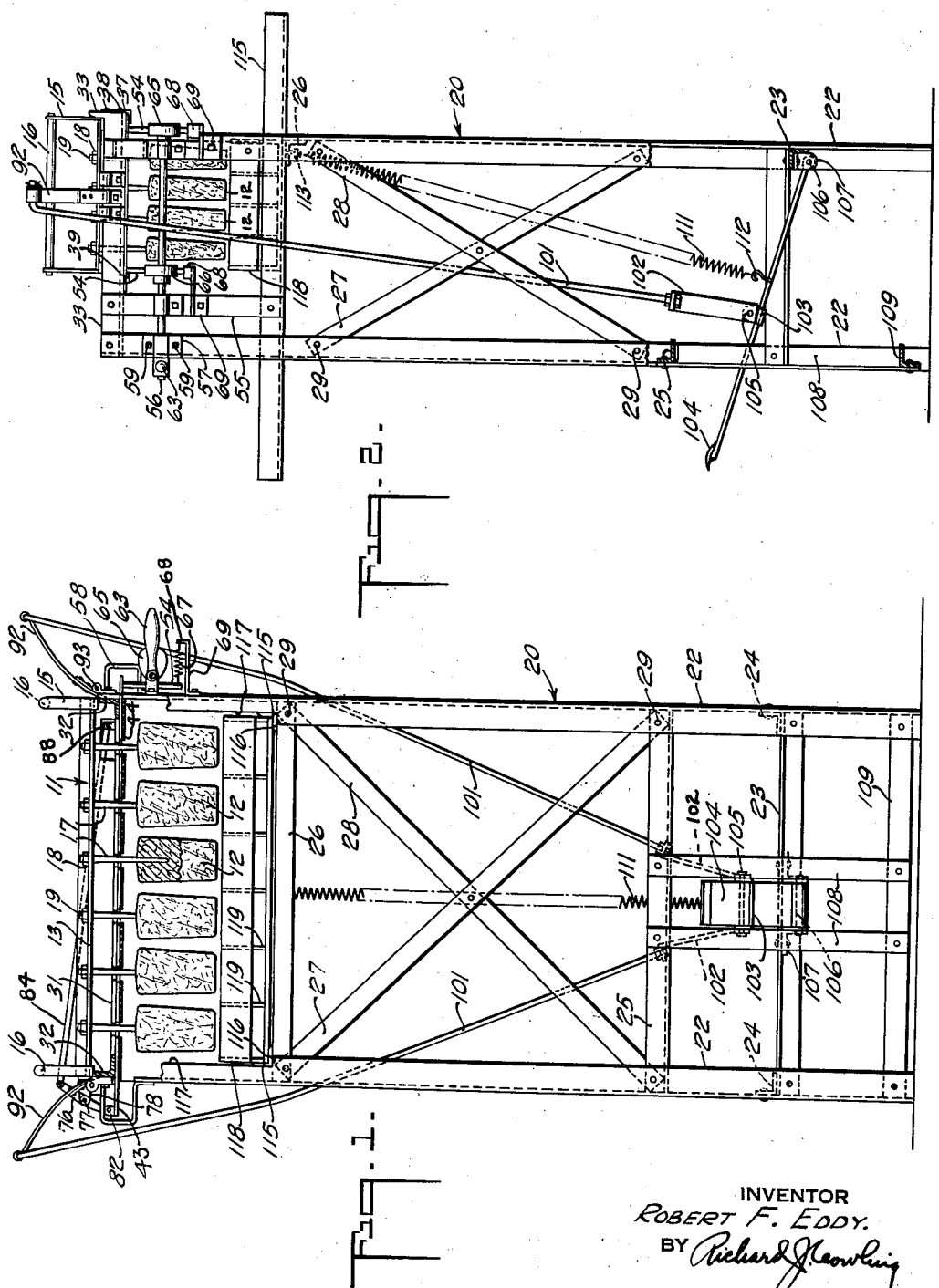
INVENTOR
ROBERT F. EDDY.
BY *Richard J. Cowling*
ATTORNEY

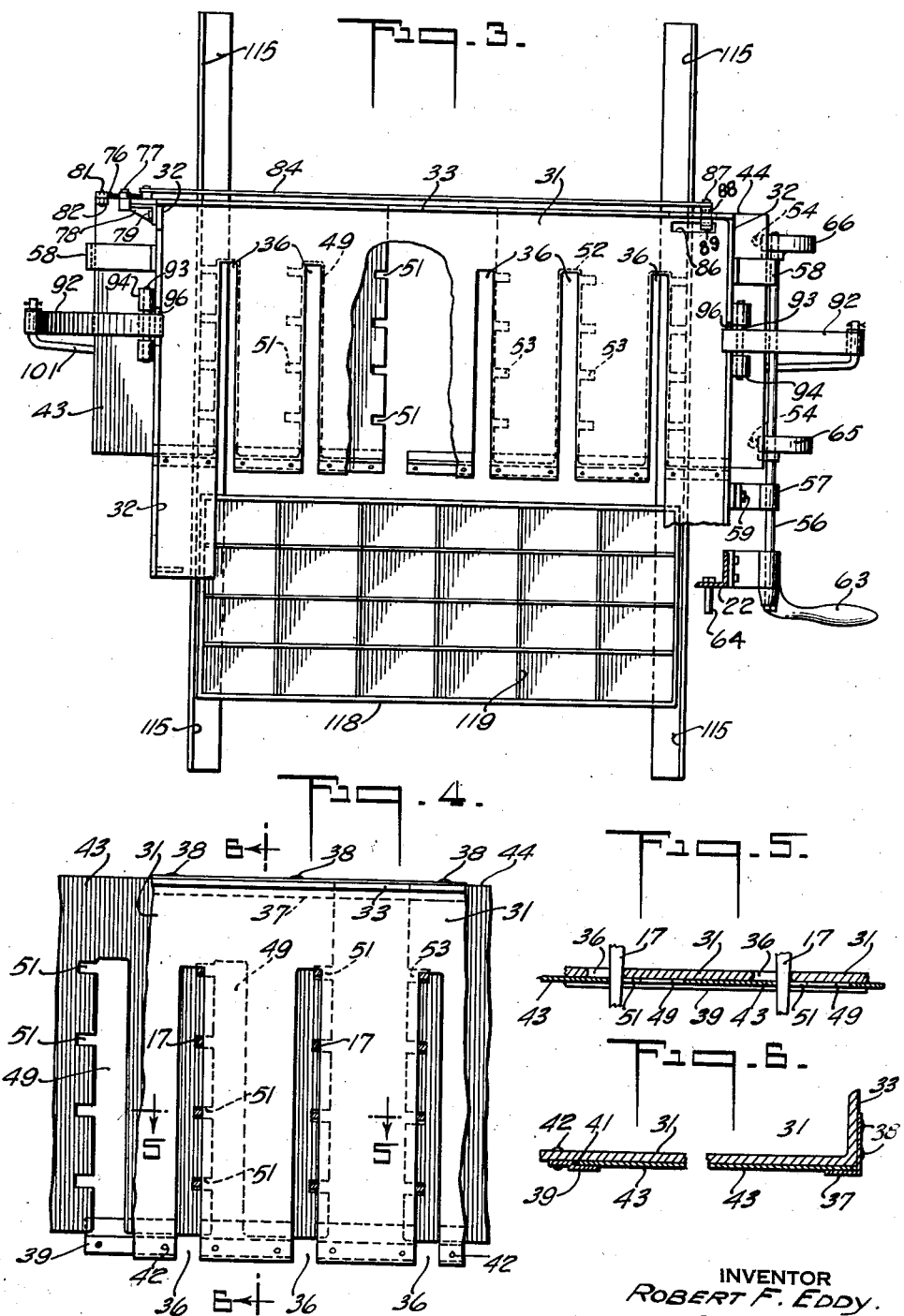

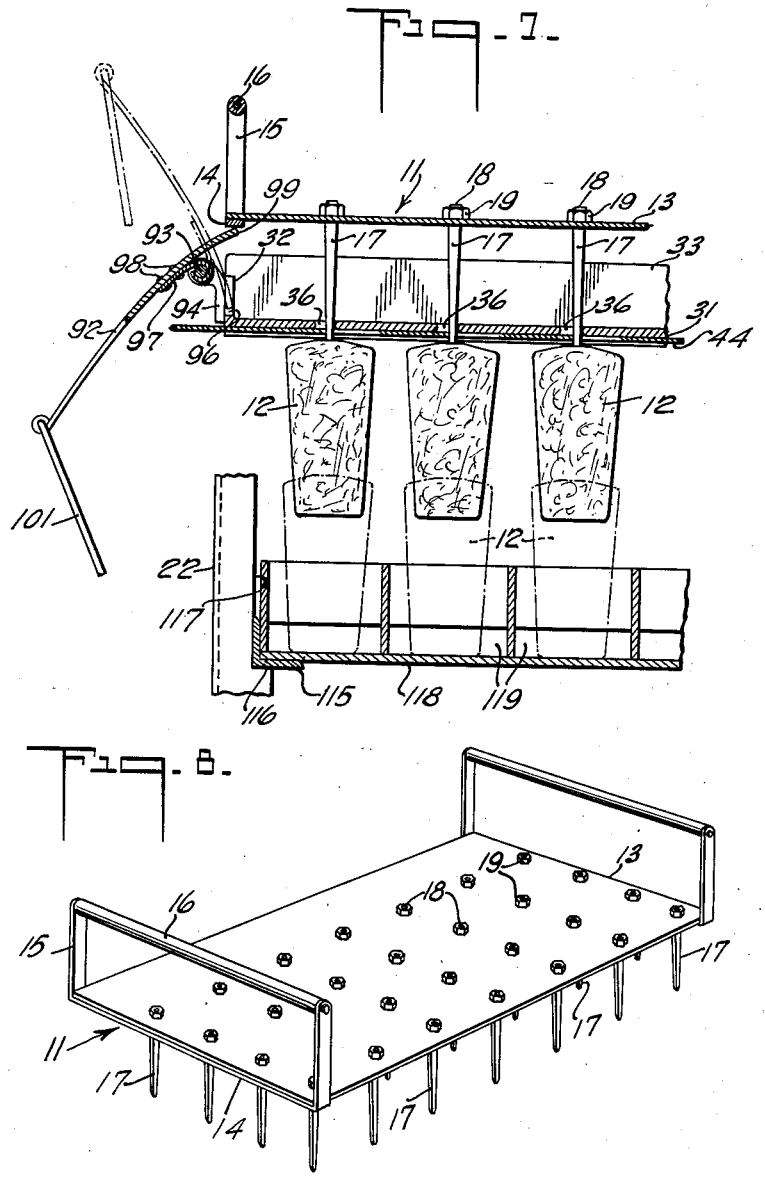

Patented Apr. 12, 1938

2,113,581

UNITED STATES PATENT OFFICE 2,113,581

APPARATUS FOR HARVESTING FROZEN CONFECTIONS

Robert F. Eddy, Long Beach, Calif., assignor to Joe Lowe Corporation, Brooklyn, N. Y., a corporation of Delaware Application September 25, 1934, Serial No. 745,418

12 Claims. (Cl. 107—8)

The present invention relates to apparatus for simultaneously removing or harvesting a plurality of frozen confections or novelties, such as ice cream bars, sherbet and ice milk bars, individual servings and the like, made by a molding process with the use of portable carriers or spur plates, which carriers or spur plates have a plurality of depending spurs or prongs onto which the confections have been frozen in the molds and by which they are removed from the molds and manipulated during the coating, bagging and/or packaging operations, and the invention has particular relation to apparatus for simultaneously removing a plurality of such confections from their respective spurs or prongs in a single operation in a most efficient, economical and sanitary manner.

Heretofore, it has been a practice in the making of such confections in multiple cavity molds to use carriers having hollow spurs containing heating elements for heating the spurs to facilitate removal of confections therefrom, or to use a carrier provided with a stripper plate mounted thereon and movably associated with the spurs or prongs to force the confections therefrom. These carriers were necessarily quite expensive to make and keep up; they are heavy to manipulate due to their weight and therefore tiring on the operator; and they are somewhat difficult to operate satisfactorily as they are dependent upon the strength and skill of the operator in the removal of the confections; and they also require considerable additional refrigeration due to the necessity of cooling the entire apparatus during each freezing operation.

An object of the present invention is to provide a simple, inexpensive carrier, which is of durable construction, having no parts to get out of order, exceedingly light in weight and therefore easy to manipulate.

Another object of the invention is the provision of apparatus of simple, inexpensive and sanitary construction for simultaneously removing a plurality of confections of the character described from a plurality of spaced spurs or prongs of a portable carrier in a single operation in a most efficient, economical and sanitary manner.

A further object of the present invention is the provision of apparatus which is capable of quickly and efficiently removing a plurality of confections from the respective spurs or prongs onto which they were bonded or frozen by means of a convenient treadle operation, thereby assuring a steady, even pull longitudinally of the spur, thus reducing the possibility of breaking or otherwise damaging the confections or their respective coatings, which frequently result from the other known devices that are directly dependent upon the steadiness, strength or skill of an operator.

Other and further objects and advantages of the invention reside in the detailed construction of the apparatus, which result in simplicity, economy and efficiency in the manufacture of confections of the character described by means of a molding and spur plate process, and which objects and advantages will be apparent from the following description, wherein a preferred form of embodiment of the invention is shown, reference being had to the accompanying drawings, forming a part thereof, in which:

Fig. 1 is a front elevational view, partially in section, of an apparatus constructed in accordance with my invention, and showing a portable carrier, having a plurality of confections bonded to the spurs depending therefrom, positioned therein;

Fig. 2 is a side elevational view, partially in section, of the apparatus shown in Fig. 1;

Fig. 3 is an enlarged fragmentary plan view of the stripping and receiving mechanism of the apparatus shown in Fig. 1, with the carrier removed and with parts being broken away for the sake of clearness;

Fig. 4 is an enlarged fragmentary plan view of the stripping mechanism shown in Fig. 3, illustrating in section the spurs of the portable carrier locked in position therein, with parts being broken away for the sake of clearness;

Fig. 5 is an enlarged sectional view of the stripping plate shown in Fig. 4, the same being taken substantially along the line 5—5 thereof;

Fig. 6 is an enlarged sectional view of the stripping plate shown in Fig. 4, the same being taken substantially along the line 6—6 thereof;

Fig. 7 is an enlarged fragmentary sectional view of the apparatus shown in Fig. 1, illustrating the manner in which the confections are removed from the spurs by raising the carrier; and Fig. 8 is an enlarged perspective view of the portable carrier shown in Figs. 1, 2 and 7.

Referring in detail to the drawings, and particularly to Figs. 7 and 8 thereof, I will first describe the portable carrier 11 to which the confections 12 are frozen and by means of which they are manipulated during subsequent manufacturing operations, such as coating, bagging and/or packaging. The carrier 11 consists of a main frame member or plate 13 (which is shown to be of rectangular shape but which may be of any desired shape corresponding to the shape of the multiple cavity mold—not shown—with which the carrier is designed to be used) having U-shape members 14 spot-welded or otherwise fastened on each end thereof to provide pairs of upstanding arms 15. Each pair of arms 15 is provided with a handle gripping member or rod 16 to facilitate handling and to permit the carrier to be conveniently lifted and transported as desired. The plate member 13 has extending outwardly and downwardly therefrom in definite spaced relation (which corresponds to the spacing of the individual cavities of the mold) a plurality of prongs or spurs 17, which are of slightly tapered construction to facilitate withdrawal from the confection bodies 12 which have been bonded thereto by congelation. The upper ends of the spurs 17, extending through the openings in the plate 13, are of slightly reduced cross-sectional diameter and threaded, as indicated at 18. Each spur 17 is securely fastened to the plate 13 by means of a nut 19 mounted on the threaded end 18 thereof extending above the plate 13. A broken, bent or otherwise damaged spur or prong 17 may be easily and quickly removed and replaced merely by loosening the nut 19.

Referring now in detail to Figs. 1 to 7 of the drawings, a stripping or harvesting machine 20 is shown in detail. This machine 20, by means of which the confections are simultaneously removed from the spurs 17 of the carrier 11 in a single operation, consists of a main supporting frame structure of substantially rectangular shape, comprising four spaced angle iron uprights or leg members 22, connected by a plurality of horizontal angle iron brace members 23, 24, 25 and 26, and reinforced on each side by flat iron brace members 27 and 28 disposed diagonally of the frame and fastened intermediate the ends of the members 22 by bolts 29.

A stationary stripping plate 31, having integral upstanding side flanges 32 forming tracks or supports for the portable carrier 11, and an upstanding back flange 33 which acts as a stop for the carrier 11 as it is being positioned thereon, is mounted adjacent the tops of the members 22, said plate 31 being provided with a plurality of spaced receiving slots or openings 36 extending in parallel relation from the front edge thereto toward the back, the number and spacing of said slots 36 corresponds to the number and spacing of the transverse rows of spurs 17 of the carrier 11. An angle iron member 37 is suspended by bolts 38 from the flange 33 with the bottom side extending inwardly of the plate 31 to form a track or supporting guide therealong. A corresponding track or supporting guide is provided along the opposite edge or front of the plate 31 by means of a plurality of spaced brackets 39, having an intermediate off-set therein as indicated at 41, secured to the underside of the plate 31 between the openings 36 by means of rivets 42.

A pair of transversely spaced plates or slides 43 and 44 are slidably mounted between the tracks thus formed. The plate 43 is provided with a plurality of spaced receiving slots or openings 49, which openings are spaced laterally corresponding to the spacing of the openings 36 of the plate 31, and extending laterally and outwardly from one side of said openings 49 and the inner edge of the plate 43 are a plurality of communicating slots 51. The plate 44 is likewise provided with a plurality of spaced receiving slots or openings 52 corresponding to the openings 36 along one half of the plate 31, and extending laterally and outwardly from one side of said openings 52 and the inner edge of the plate 44 are a plurality of communicating slots or openings 53. The spacing of the slots 51 of the plate 43 and the slots 53 of the plate 44 corresponds to the spacing of the longitudinal rows of spurs 17 of the carrier 11. The plate 44 has extending downwardly therefrom along its extreme outer edge a pair of spaced rods 54.

The mechanism for operating the slidable plates 43 and 44 toward and away from each other, for the purpose of closing and opening the slots 36 of the plate 31, is mounted outwardly along one side of the main supporting frame, and consists mainly of a rotatable shaft 56 suitably mounted in bearings secured in brackets 57 and 58, fastened by rivets 59 to the legs 22. A handle 63 is mounted on the forward end of the shaft 56 convenient to the operator of the machine, and is provided with a stop 64 extending outwardly from the leg 22, as shown in Fig. 3, to prevent counter-clockwise movement of the handle 63 therebeyond. Cams 65 and 66 are fixedly mounted on the shaft 56 opposite the rods 54, and the rods 54 are always maintained in direct contact with the surfaces of the cams by suitable spring urging means 67 connected between the lower ends of the rods 54 and to an upstanding arm 68 of a suitable bracket support 69 mounted on the leg 22 and a brace rod 55.

When the handle 63 is in the position shown in Fig. 1, the openings or slots 36 of the plate 31 and the openings or slots 49 of the plate 43 and the openings 52 of the plate 44 are in vertical alignment, which is the receiving position for the carrier 11. Movement of the handle 63 in a counter-clockwise direction causes the cams 65 and 66 to force the rods 54 inwardly toward the center of the main frame structure, thereby moving the plate 44 a corresponding distance in the same direction closing the openings 36 in the plate 31, and the spurs 17 of the carrier 11, which are extending therethrough, are clampingly engaged by the plate 44 at the end or back of the laterally extending communicating slots 53, as best shown in Figs. 4 and 5 of the drawings.

Movement of the plate 44, through suitable lever arrangements, causes the plate 43 to be likewise moved inwardly toward the center of the main frame structure, thereby closing the openings 36 in the plate 31 which are directly above the plate 43, and the end or back of the laterally extending communicating slots 51 clampingly engage the spurs 17 passing therethrough. The lever arrangement for moving the plate 43 relative to the plate 31 is mounted on the side of the main supporting frame structure 20 opposite from the mechanism for operating the plate 44, and consists of a lever 76 pivotally mounted on a pin 77 extending from a bracket 78 rigidly secured to the flange 32 of the plate 31 by rivets 79. The lower end of the lever 76 is pivotally fastened to a pin 81 journaled in a bifurcated bracket 82 rigidly mounted on the outer edge of the plate 43. The upper end of the lever 76 is pivotally connected to one end of a connecting rod 84, which extends transversely along the back of the machine 20, and is pivotally connected at the opposite end to the plate 44, through a suitable slot or opening 86 in the plate 31, by means of a pin 87 extending from an upstanding arm 88 of a bracket 89 secured to the top of the plate 44.

Means for moving the carrier 11 with its depending spurs 17 relative to the stripping mechanism, and plate 31, consists of oppositely disposed levers 92 mounted to fulcrum about a shaft 93 journaled in brackets 94 mounted on opposite sides of an opening 96 in the flanges 32 of the plate 31, the levers 92 being mounted on the shaft 93 by means of a spring clip 97 secured by rivets 98 to the underside thereof. The lower ends 99 of the levers 92 are adapted to pass through the openings 96 in the flanges 32 and engage the underside of the ends of the carrier 11, as best shown in Fig. 7. The upper ends of the levers 92 are connected by rods 101 to links 102 which in turn are connected to a bracket 103 by means of a pin 105, the bracket 103 being secured by welding or other suitable means intermediate the ends of the foot treadle 104. The foot treadle 104 is pivotally connected to the brace rod 23 extending across the back of the machine 20 by a pin 106 mounted in a bracket 107 secured to the underside thereof. A track for guiding the movement of the treadle 104 is provided at the front of the machine 20, and consists of spaced parallel vertical bars 108 mounted intermediate the ends of the cross-braces 23, 25 and 109. The treadle 104 is maintained in its normal raised position, except, however, when pressure is being applied by the foot of the operator, by means of a spring 111 which is connected to the treadle member 104 intermediate the bracket 103 and the bracket 107 by means of a hook 112, the opposite end of the spring 111 being connected to the cross-bar 26 by means of a hook 113 secured thereto in any suitable manner.

A track comprising a pair of spaced parallel angle iron supports 115 is mounted immediately below the stripping mechanism on the top of the brace rod 26 and ledges 116 formed by notches 117 cut into the legs 22, and is adapted to support a basket 118 for receiving the frozen confections 12 as they are forced from their respective spurs 17 of the carrier 11. A preferred form of receiving basket 118 is provided with a plurality of subdivisions 119, which prevents the confections from directly contacting one another after they are removed from the spurs 17.

In operation of the apparatus, the handle 61 is moved in a clockwise direction to the position shown in Figs. 1 and 3, which movement is limited by the bracket 89 in the slot 86 of the plate 31, in which position the openings in the plates 43 and 44 are in vertical alignment with the corresponding openings in the plate 31, as shown in Fig. 3. A portable carrier 11, having a plurality of confections 12 bonded to the lower ends of the spurs 17, is positioned on the flanges 32 and moved toward the back of the machine until stopped by the flange 33, the spurs extending downwardly through the aligned openings in the plates 31, 43 and 44. The handle 61 is then moved in a counter-clockwise direction, and the cams 65 and 66 force the rods 54 and the plate 44 inwardly, causing the plate 44 to close the openings 36 in one-half of the plate 31 and the slots 53 thereof to engage the spurs 17. The plate 43 is likewise moved inwardly by the bracket 89 through the connecting rod 84, which in turn moves the upper end of the lever 76 to the left causing it to fulcrum on the shaft or pin 77 thereby moving the lower end thereof to the right, which being secured to the plate 43 through the bracket 82 is caused to be moved in the same direction thereby closing the openings 36 in the plate 43 and causing the slots 51 thereof to engage the spurs 17 of the carrier, as best shown in Figs. 4 and 5.

The operator then presses down on the foot treadle 104, causing it to be moved against the spring tension 111, which in turn through the bracket 103, links 102 and connecting rods 101 causes the lever 92 to fulcrum about the shaft 93, thereby moving the lower ends 99 of the lever 92 through the opening 96 in the flanges 32 and causing them to engage the underside of the carrier 11 and carry the same vertically with respect to the plate 31. Movement of the carrier 11 upwardly in the manner described causes the tops of the confections 12 to engage the bottom of the stripping mechanism, or the plates 43 and 44, whereby they are forced from their respective spurs simultaneously in a single operation as the spurs 17 are carried through the small openings 51 and 53 of the plates 43 and 44 by which they are snugly engaged. As soon as the upward movement of the carrier 11 causes pressure to be exerted on the tops of all of the confections simultaneously, the bond between the frozen mass and the spurs 17 is broken and the confections 12 drop from the spurs into the individual partitions 119 of the receiving basket 118 positioned on the tracks 115 immediately below the stripping mechanism.

Although I have only described in detail one form which the invention may assume, it will be apparent to those skilled in the art that the invention is not so limited, but that various modifications may be made therein without departing from the spirit thereof or from the scope of the appended claims.

What I claim is:

1. In a machine of the character described and in combination, a portable carrier including a spur depending therefrom, and a supporting member for said carrier including a stripping plate having an opening therein for receiving said spur, and means interposed between said carrier and stripping plate for causing relative movement between said spur and said plate to cause the lower portion of the spur to be withdrawn through the plate thereby stripping the confection bonded to the end of the spur therefrom.

2. In a machine of the character described and in combination, a portable carrier having a spur extending therefrom, and a supporting member for said carrier including a stripping plate having an opening therein for receiving said spur, and means associated with said plate for closing the opening therein around said spur, and means for causing relative movement between said spur and said plate to cause the lower portion of the spur to pass through said plate to force the confection bonded to the end of the spur therefrom.

3. In a machine of the character described and in combination, a portable carrier having a plurality of prongs extending therefrom, and a frame structure having means for supporting said carrier, a stripping plate having openings therein for receiving the prongs of said carrier, means associated with said plate for closing said openings about said prongs, and means for moving said prongs relative to said plate to cause the lower portions of said prongs to be withdrawn through the openings in said plate thereby forcing from the ends of said prongs the confections clinging thereto.

4. In a machine of the character described and in combination, a portable carrier having a plurality of prongs extending outwardly therefrom in spaced relation, and a frame structure including means for supporting said carrier, clamping means associated with said supporting means for slidably engaging said prongs immediately below said carrier frame, and means interposed between said carrier and stripping plate for moving said prongs relative to said clamping means for simultaneously exerting pressure on the tops of the confections bonded to the lower ends of said prongs thereby forcing them from their respective prongs in a single operation.

5. In a machine of the character described and in combination, a portable carrier having a plurality of outwardly extending prongs, and a frame structure adapted to support said carrier, said frame structure having a stripping plate provided with a plurality of slots therein to receive the rows of prongs of said carrier, means associated with said slots for closing the same about said prongs, and means for causing relative movement between said prongs and plate to cause pressure to be exerted on the tops of the confections bonded to the ends of said prongs and thereby force them from the prongs in a single operation.

6. In a machine of the character described and in combination, a portable carrier having a plurality of outwardly extending spurs, and a frame member adapted to support said carrier, said member having a slotted plate adapted to receive the spurs immediately below the underside of said carrier, means for closing the slots in said plate about said spurs, and means including a treadle for withdrawing said spurs through said plate thereby causing pressure to be exerted on the tops of the confections bonded to the ends of said spurs to force them from the spurs in a single operation.

7. In a machine of the character described, comprising a frame member adapted to receive and support a portable carrier having a plurality of spaced prongs extending therefrom, a stripping plate having a plurality of openings therein for receiving said prongs, means associated with the openings in said plate for closing the same about said prongs, and means for causing relative movement between said plate and said prongs for forcing confections bonded to the ends of said prongs therefrom.

8. In a machine of the character described, comprising a frame member adapted to receive a portable carrier having a plurality of spaced spurs extending therefrom, a stationary stripping plate having a plurality of slots therein adapted to receive rows of spurs of said carrier, means associated with said plate for closing the slots therein about said spurs, and means for moving said carrier with respect to said stripping plate to withdraw the prongs of said carrier upwardly therethrough.

9. In a machine of the character described, comprising a frame member having an apertured plate for receiving and supporting a portable carrier having a plurality of spaced spurs extending outwardly therefrom, means for closing the apertures in said plate about the spurs, and means including a treadle for moving said carrier with respect to said plate thereby causing the spurs to be withdrawn through said apertures of said plate.

10. In a machine of the character described, comprising a frame structure having an apertured plate adapted to receive and support a portable carrier having a plurality of spaced prongs extending therefrom, means interposed between said carrier and plate for moving said carrier with respect to said plate and causing the prongs to be withdrawn through the latter, and supporting means for receiving a container disposed below said stripping plate to catch the material to be forced from the prongs when the latter are withdrawn through the plate.

11. In a stripping machine for removing confections from the prongs of a portable carrier comprising a frame structure having supporting means for supporting said carrier, a stripping plate having openings therein carried by said frame structure for receiving the prongs of said carrier when supported by said supporting means, and means interposed between said carrier and stripping plate for causing relative movement between the carrier and the plate to cause the lower ends of the prongs to pass through said openings in said stripping plate thereby forcing from the ends of said prongs the confections bonded thereto.

12. In a stripping machine for removing confections from the outwardly projecting prongs of a portable carrier comprising a frame structure for supporting said carrier, a stripping plate adapted to enclose said prongs adjacent the carrier, and means for moving said carrier with respect to said plate for causing pressure to be exerted on the tops of the confections secured to the outer ends of said prongs to force them therefrom in a single operation.

ROBERT F. EDDY.